United States Patent
Amann et al.

(10) Patent No.: US 9,020,547 B2
(45) Date of Patent: Apr. 28, 2015

(54) METHOD FOR SYNCHRONIZING U-APSD TRIGGER FRAMES

(75) Inventors: Keith R. Amann, Westminster, CO (US); Mark A. Hamilton, Superior, CO (US); Oliver J. Krahn, Superior, CO (US)

(73) Assignee: SpectraLink Corporation

( * ) Notice: Subject to any disclaimer, the term of this patent is extended or adjusted under 35 U.S.C. 154(b) by 910 days.

(21) Appl. No.: 11/717,401

(22) Filed: Mar. 13, 2007

(65) Prior Publication Data

US 2008/0225756 A1    Sep. 18, 2008

(51) Int. Cl.
*H04B 7/00* (2006.01)
*H04W 74/08* (2009.01)
*H04W 56/00* (2009.01)
*H04W 52/02* (2009.01)

(52) U.S. Cl.
CPC .......... *H04W 74/0891* (2013.01); *H04W 56/00* (2013.01); *H04W 52/0216* (2013.01)

(58) Field of Classification Search
CPC ............ H04W 56/00; H04W 74/0891; H04W 52/0216
USPC ............... 370/350, 260, 338, 324; 455/412.1, 455/41.2, 466, 445, 456.3, 414.1, 432.3, 455/502, 509, 208; 705/14.5; 709/203; 375/272

See application file for complete search history.

(56) References Cited

U.S. PATENT DOCUMENTS

| | | | | |
|---|---|---|---|---|
| 6,044,084 | A * | 3/2000 | Fishman | 370/445 |
| 6,587,453 | B1 * | 7/2003 | Romans et al. | 370/347 |
| 6,917,598 | B1 * | 7/2005 | Emeott et al. | 370/311 |
| 7,274,708 | B2 * | 9/2007 | Benveniste | 370/445 |
| 7,280,555 | B2 * | 10/2007 | Stanforth et al. | 370/445 |
| 7,397,785 | B2 * | 7/2008 | Wu et al. | 370/350 |
| 7,457,271 | B2 * | 11/2008 | Donovan | 370/338 |
| 7,522,630 | B2 * | 4/2009 | Ho et al. | 370/447 |
| 7,529,274 | B2 * | 5/2009 | Porter | 370/512 |
| 2003/0174690 | A1 * | 9/2003 | Benveniste | 370/350 |
| 2004/0131019 | A1 * | 7/2004 | Kandala | 370/311 |
| 2004/0253996 | A1 * | 12/2004 | Chen et al. | 455/574 |

* cited by examiner

*Primary Examiner* — Mahendra Patel
(74) *Attorney, Agent, or Firm* — Honigman Miller Schwartz and Cohn LLP

(57) ABSTRACT

A wireless LAN is comprised of a number of wired infrastructure devices, including at least one access point able to support a number of wireless communication devices configured to operate in the U-APSD mode. The wireless communications devices periodically contending for the wireless medium to transmit trigger messages to the access point and the access point responding by transmitting at least one frame of information. The wireless communications devices operate to synchronize the transmission of their trigger messages such that the possibility that the messages collide with one another is minimized.

18 Claims, 9 Drawing Sheets

METHOD FOR SYNCHRONIZING U-APSD TRIGGER FRAMES

FIELD OF INVENTION

Our invention relates generally to the field of wireless communications in a LAN environment where the wireless communications devices are configured to operate in the unscheduled automatic power save delivery mode and our invention relates specifically to synchronizing the trigger frames between devices during operation in the U-APSD mode.

BACKGROUND OF INVENTION

A power save mode is primarily employed by wireless communications devices, such as mobile phones, to preserve battery life during the time that the mobile phone is turned on but not actively transmitting or receiving packets for some specified period of time. Mobile phones are typically configured to automatically transition to the power save mode if they detect the cessation of traffic to and from their transceiver for some predetermined period of time. If a mobile phone has been configured such that the power save mode is enabled, it will periodically transition from a higher powered state, or a state in which the transceiver is turned on for instance, to a lower powered state, or a state in which the transceiver is turned off for instance, during periods of inactivity. In this lower powered state, the mobile phone will periodically "wake up" or transition to a higher powered state for a short time in order to receive packets of information from the access point with which it is currently associated and then transition back to the lower powered state. Generally, an access point will buffer one or more frames of information addressed to a particular mobile phone that is power save mode enabled and which is in a lower powered state until the phone transitions to a higher powered state, at which time the buffer frames could be transmitted to the mobile phone. The process by which a mobile phone is configured to be power save mode capable and the protocol that a wireless LAN follows for managing the buffering and transmission of frames of information is specified by the IEEE 802.11 standard.

While the power save capability specified by 802.11 addresses the battery life issue, it does not address quality of service issues. To this end, the IEEE 802.11e standard which extends 802.11 into the area of quality of service was developed. Generally, the 802.11e standard specifies formats and protocols to use at an access point and at a mobile phone that enables the prioritized delivery of frames of information according to a user priority or access category assigned to the frames as they are generated by the mobile phone. Specifically with respect to 802.11e standard, there are two different power save modes that have been specified for use to deliver frames of information labeled for priority delivery. One mode allows for the scheduled delivery of traffic by the access point to a phone and is referred to as Scheduled Automatic Power Save Delivery (S-APSD) and a second allows for the unscheduled delivery of traffic by the access point to a phone and is referred to as Unscheduled Automatic Power Save Delivery or U-APSD. These scheduled or unscheduled modes are defined from the perspective of the AP and should be used when it is desirable to provide quality of service (QoS) functionality in conjunction with extended battery life. It is recommended that the S-APSD mode be employed by devices using polled access and that the U-APSD mode be employed by devices using contention-based access. Basically, APSD was developed to add QoS functionality and a more efficient power save mode to the Standard.

Access points which service mobile phones that are configured to operate in the U-APSD mode will buffer frames of audio and other information destined for these phones until they receive a signal or a trigger message from the mobile phone that results in the access point transmitting some or all of the buffered frames to the mobile phone. Trigger frames transmitted by mobile phones when in the U-APSD mode can collide with frames transmitted by the AP, or the trigger frames transmitted by other mobile phones associated with the same access point causing the phone to initiate a back-off procedure and result in delay being injected into the transmission of voice information. This delay has the effect of reducing the quality or capacity of the communications sessions. Such collisions between trigger frames tend to counteract the benefits realized as the result of configuring a mobile phone to operate in the U-APSD mode.

It is one objective of our invention to enable a mobile phone to operate in the U-APSD mode to periodically transmit a trigger message without the possibility of collision with a trigger message transmitted by another mobile phone also configured to operate in the U-APSD mode.

Further, it is another objective of our invention to accomplish this avoidance of collisions without the need for or use of any additional signaling to coordinate between the phones. Such additional signaling would consume more bandwidth and thus reduce the effectiveness of the solution.

We have achieved the above mentioned objectives of our invention by configuring a mobile phone to sense the wireless medium in order to detect the end of another mobile phones unscheduled service period and then to send a trigger message after waiting less than a time interval specified for any other mobile phone associated with the same access point to begin arbitrating for the medium.

SUMMARY OF THE INVENTION

In one embodiment of our invention, in a wireless LAN the trigger messages for two or more mobile phones communicating over a wireless medium to an access point are synchronized in a method comprised of one mobile phone sensing the occurrence of a first unscheduled service period associated with another mobile phone followed by some specified free air period and stores the ending time of the unscheduled service period; the mobile phone then senses the occurrence of a next unscheduled service period associated with the other mobile phone to be at the same time, relative to a known, periodic frame delivery interval, as the stored first unscheduled service period and transmits a trigger message subsequent to the end of the next unscheduled service period after waiting less than the time interval specified for another mobile phone associated with the access point to begin arbitrating for the wireless medium.

In another embodiment of our invention, the time interval between unscheduled service periods among two or more phones is minimized in a method whereby one mobile phone starts sensing the wireless medium at a particular point in time contending to transmit a trigger message, the mobile phone gains access to the medium and transmits a trigger message after which the mobile phone decrements the time at which it starts sensing the medium and then starts sensing the medium again at the decremented time and detects the ending time of an unscheduled service period associated with another mobile phone and transmits a trigger message after waiting less than the time interval for any other mobile phone associated with the access point to begin arbitrating for the wireless medium.

In yet another embodiment of our invention, two or more mobile phones communicating over a wireless medium to an access point are synchronized in a method comprised of one mobile phone contending for the wireless medium, successfully gaining access to the medium, sending a first trigger message in a first unscheduled service period and storing the time of successful transmission; the mobile phone transmitting the trigger message during its next unscheduled service period at the same time, relative to the known, periodic frame delivery interval, stored for the transmission of the first trigger message and continuing in this fashion for subsequent unscheduled service periods as long as no collision with the other phone continues.

BRIEF DESCRIPTION OF THE DRAWINGS

FIG. 5b is a continuation of the logical flow diagram in FIG. 5a.

FIG. 6b is a continuation of the logical flow diagram in FIG. 6a.

DETAILED DESCRIPTION OF INVENTION

This non-provisional application claims the benefit of an earlier filed provisional application No. 60/787,758 filed Mar. 31, 2006. It is necessary to possess a working knowledge of ANSI/IEEE Std 802.11, 1999 Edition (802.11) and IEEE P802.11e/D13.0, January 2005 (802.11e) edition, both of which are hereby incorporated into this application in their entirety, in order to implement the method and apparatus of our invention.

Figure 1:
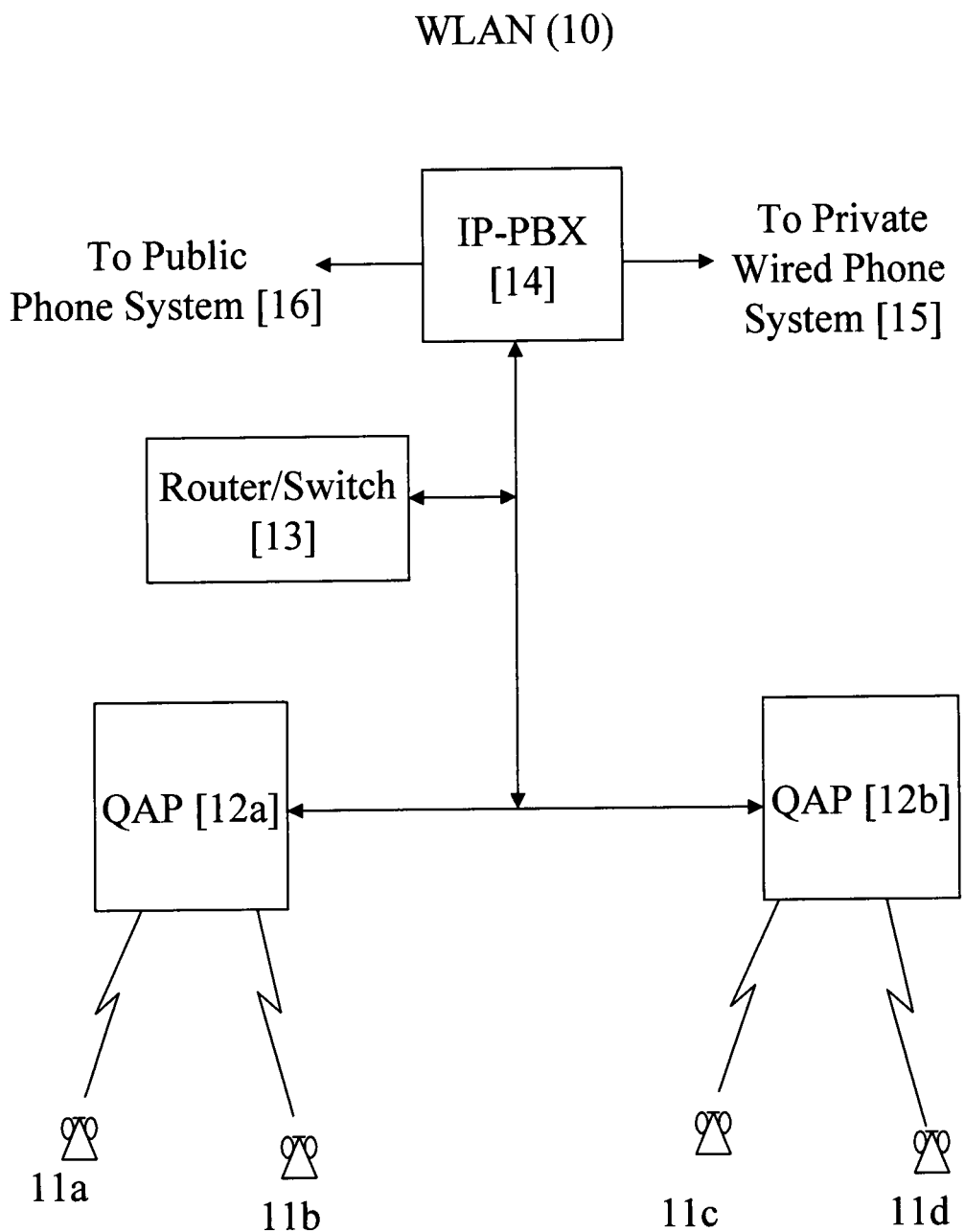
FIG. 1 is a high level block diagram of a wireless LAN showing representative infrastructure wired devices and the wireless communication devices.

Referring to FIG. 1, QoS capable mobile phones 11a and 11b are associated with QoS capable access point 12a and QoS capable mobile phones 11c and 11d are associated with QoS capable access point 12b in the wireless LAN (WLAN) 10. More specifically, the QoS capable mobile phones and the QoS capable access points can be configured to operate in the unscheduled, automatic, power-save delivery or U-APSD mode. A QoS capable mobile phone configured to operate in the U-APSD mode, hereinafter simply referred to as a QSTA, and a QoS capable access point configured to operate in the U-APSD mode, hereinafter simply referred to as the QAP, communicate with each other using the communications protocol and frame formats specified by at least the combination of the 802.11 and 802.11e standards. The process whereby an STA or QSTA associates with an AP or QAP will be described later in more detail. The 802.11e standard specifies QoS enhancements to the 802.11 standard which specifies the medium access control (MAC) and physical layer (PHY) protocols and compatible interconnection of data communications equipment via various wireless mediums in a wireless local area network (WLAN) using the CSMA/CA medium sharing mechanism. A typical WLAN environment in which the mobile phones operate is described hereafter with reference to FIG. 1.

In FIG. 1, the QSTAs 11a, 11b, 11c and 11d are all wireless devices with U-APSD and MAC functionality modified according to the method of our invention that permits each of them to synchronize the transmission of their trigger messages without the possibility that they will collide and to transmit their trigger messages on a priority basis over other unmodified QSTAs. These trigger messages can be trigger frames as described in the 802.11e specification or any non-standards based message that once transmitted by a QSTA in the U-APSD mode results in the transmission of packets buffered at the QAP with which the QSTA is associated. FIG. 1 illustrates two QSTAs 11a and 11b associated with QAP 12a and two QSTAs 11c and 11d associated with QAP 12b, but there could more or fewer QSTAs associated with either one of the two QAPs. The QAP 12a, for example, can receive frames of information from QSTA (11a), and may buffer these frames before ultimately transmitting them to a destination QSTA, QSTA 11b for example, after receiving a trigger frame from the destination QSTA 11b. Communications over the LAN 10 between the QAPs 12a and 12b is managed by Router/Switch 13, or any other type of device that is able to receive frames from one device and forward them to another device. The well known IEEE 802.3 (Ethernet) standard protocol is employed on the LAN for communications between the QAPs, the Router/Switch 13 and the IP-PBX 14. Router/Switch 13, herein after referred to as Router 13, generally operates to receive frames of information from one QAP, QAP 12a for instance, and to transmit them to another QAP, QAP 12b, for instance, according to the destination address information contained in the frame of information. The IP-PBX 14 operates to direct frames of information to either a private, wired phone system 15 or to a public phone system 16 depending upon the destination address contained in a particular frame of information.

Figure 2:
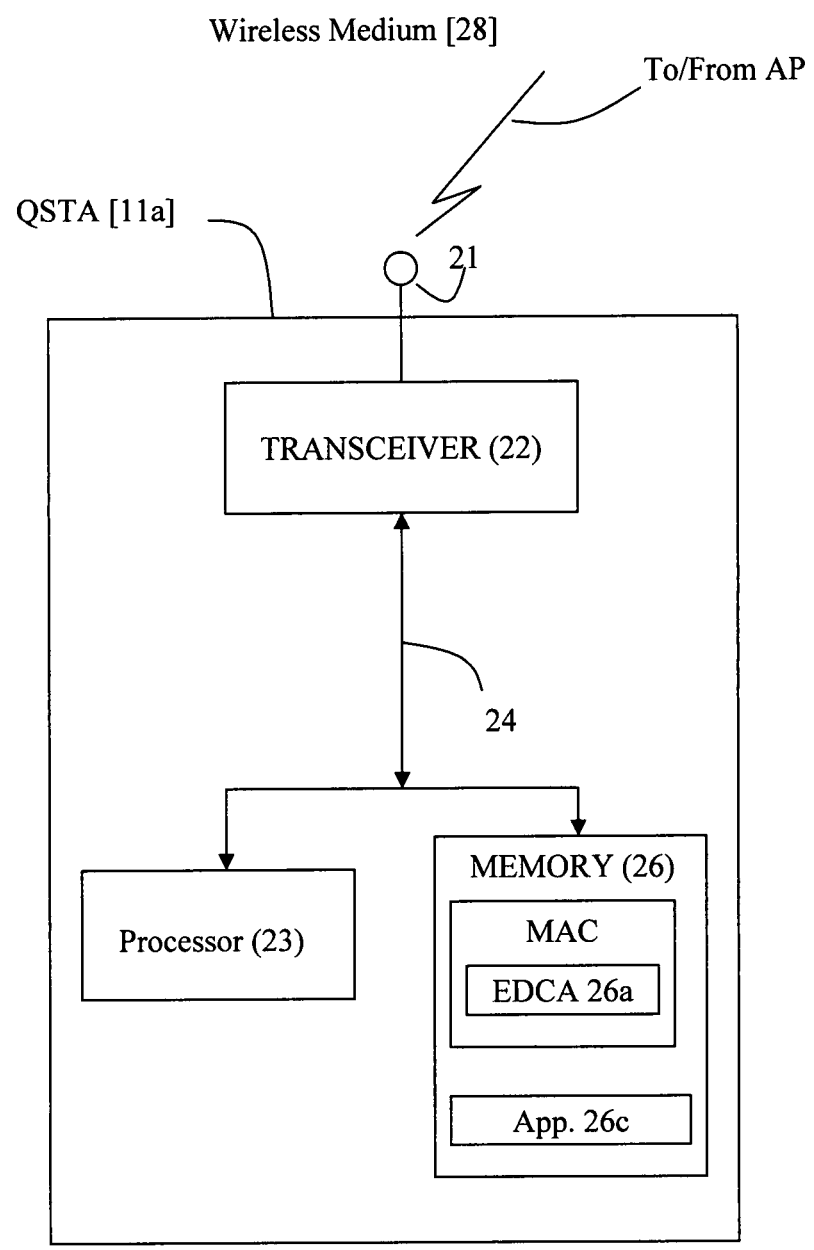
FIG. 2 is a high level functional block diagram of a wireless communications device.

FIG. 2 is a functional block diagram of any one of the QSTAs 11a, 11b, 11c, or 11d which, for the purposes of this application, can all be considered of equivalent capability and to have equivalent configurations and will be referred to collectively as QSTA 11. QSTA 11 includes an antenna 21, which operates to propagate wireless signals and is the initial reception point for incoming wireless signals. The antenna is connected to a transceiver 22, which operates to demodulate the signals containing voice information received from the antenna or to modulate signals prior to their being sent to the antenna. The transceiver is connected over a parallel bus 24 to, a processor 23, memory 26.

Continuing to refer to FIG. 2, processor 23 generally functions in conjunction with memory 26, and under the control of a telephony application 26c stored in the memory, to perform certain functions necessary for the operation of the phone. The telephony application 26c generally controls such QSTA functionality as initiating, maintaining, and tearing down communications sessions. The memory 26 can be an EEPROM, RAM or flash memory and is generally employed to store the telephony application, as previously mentioned, and to store a software module that implements medium access control (MAC) functionality that is enhanced according to the 802.11 e standard to support WLAN applications with QoS requirements and which implements the trigger frame synchronizing method of our invention, which we will discuss later in this application. The fundamental medium access protocol specified by 802.11e is an enhanced distributed coordination access (EDCA) function, which supports a carrier sense multiple access with collision avoidance (CSMA/CA) protocol. Generally, the EDCA function operates to permit for automatic medium sharing between compatible physical mediums through the use of the CSMA/CA protocol and a random back off time following a busy condition. Additionally, all wireless devices use immediate positive acknowledgement (ACK) where retransmission of frames, that are not successfully received, is scheduled by the sender if no ACK is received. In operation, the CSMA/CA protocol reduces the probability that collisions will occur between two or more wireless devices that have been waiting for the medium to become idle. A distributed carrier sense strategy is employed where each wireless device in the LAN monitors the state of the medium and at the point that the medium becomes idle, the device starts a random back off procedure which must be completed before it gains access to the medium. The use of this random back off procedure decreases the probability that collisions will occur.

As mentioned above, the 802.11e standard specifies some QoS enhancements to the DCF specified by 802.11 and one of these enhancements is the previously mentioned U-APSD mode of operation. The 802.11e standard refers to this contention-based channel access method as the enhanced distributed channel access (EDCA) function and at least one instance of this function is stored in memory 26 as EDCA function 26a shown in FIG. 2. The method of our invention is implemented in the MAC 26a as instructions that modify the operation of the 802.11e standards based EDCA function, with respect to a QSTA configured to operate in the U-APSD mode, such that the trigger frames transmitted by all modified QSTA's associated with a particular QAP are synchronized and so will not collide with each other. Our invention does not require that any changes be made to existing QAPs and does not require any additional signaling between the QSTAs and the QAP. Our invention results in a higher quality of service and permits the use of a more aggressive algorithm in order to gain access to the wireless medium which results in higher service priority. Additionally, the ability to synchronize the trigger frames results in increased time available to perform other operations such as the handoff process and transitioning to a lower power state.

Figure 3:
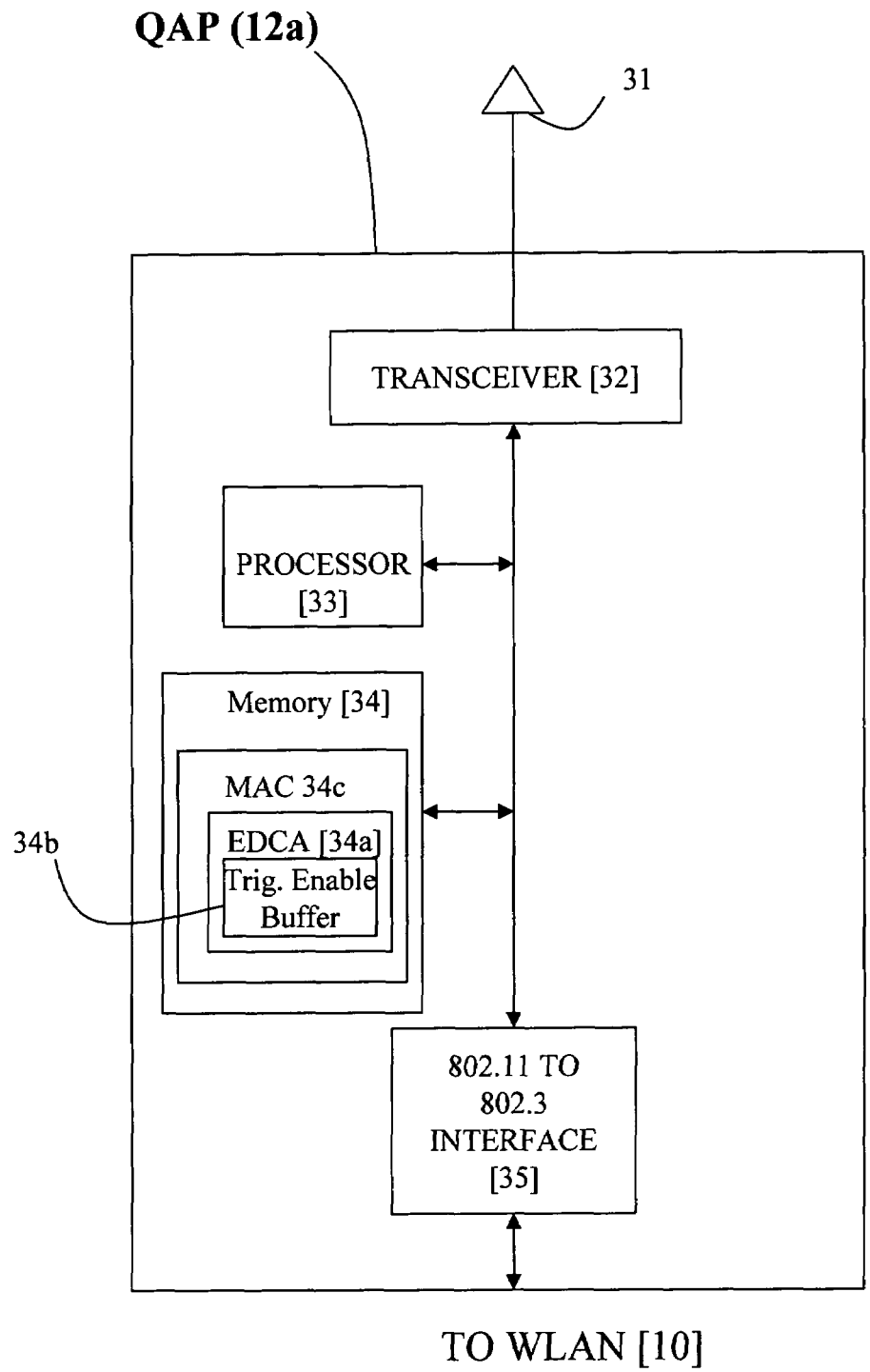
FIG. 3 is a high level functional block diagram of an access point.

FIG. 3 is a functional block diagram of QAP 12a or 12b which for the purpose of this description can be considered to be similarly enabled and configured. Both QAP 12a and 12b generally operate to receive wireless signals transmitted by a QSTA, which in the case of QAP 12a could be QSTA 11a for instance, places the frames into a queue or queues where they are available for transmission to a destination QSTA, QSTA 11b for instance, associated with the same QAP or to be transmitted to another QAP, QAP 12b for instance, over the wired portion of the WLAN 10. In the later case in which the frames are to be transmitted to QAP 12b, QAP 12a converts the frames from the 802.11 frame format to the well known 802.3 Ethernet format for transmission over the wired portion of the WLAN 10 to QAP 12b where they are converted back to the 802.11 format for transmission over the wireless medium to QSTA 11c or 11d for instance. From the perspective of the WLAN 10, QAPs 12a and 12b have similar functionality to a QSTA, in as much as it receives frames of information from QSTAs, places them in a queue according to their priority, contends for the medium according to the CSMA/CA protocol, and when it gains access to the medium, transmits the frames according to their priority to another QSTA. Unlike a QSTA, a QAP generates beacons, for among other things, to broadcast capability information to QSTAs within transmission range and it is the target for QSTA association requests. Specifically, the QAP 12a of FIG. 3 has an antenna 31, transceiver 32, processor 33, and memory 34 all of which possess functionality similar to the antenna 21, transceiver 22, processor 23, and memory 26 of QSTA 11a of FIG. 2. Specifically, the EDCA function 34a used by the QAP is stored in memory 34 and in this case the QSTA 11a will request that the QAP use the U-APSD mode of operation. This QSTA request is made in the form of a TSPEC which will be discussed later with reference to FIG. 4. The 802.11 to 802.3 interface 35 of FIG. 3 generally operates to convert frames of information from the 802.11 format to the Ethernet format and transmit these frames to the wired portion of WLAN 10.

Returning to FIG. 2, during the time that a QSTA is in a call, the telephony application 26c generally operates to control or manage when in time a QSTA transitions from a higher powered state, such as when the QSTA is transmitting or receiving packets, to a lower powered state, such as when the phone is not transmitting or receiving packets. The telephony application also operates to control the MAC, so that the MAC sets bits in certain fields of frames that are transmitted by the QSTA. The telephony application also manages the process by which QSTAs associate with QAPs when roaming from one QAP to another. In the event that the AP is QoS capable, or that it is a QAP, the QSTA will then transmit an association request frame to the QAP to determine whether or not the QAP is available to receive its traffic. The format of the association request frame described above will now be described with respect to FIG. 4.

Figure 4:
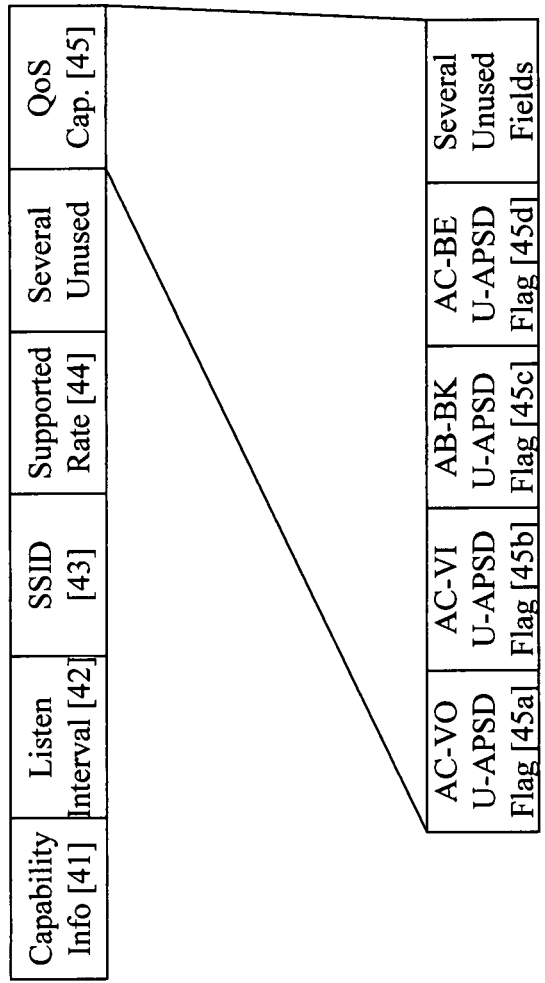
FIG. 4 illustrates the format of an association request frame.

FIG. 4 illustrates the format of the body of an association request frame showing a number of fields including a capability information field 41, a listen interval field 42, a SSID field 43, a supported rate field 44, and a number of null fields including a QoS capability information element 45. We will not describe how the fields other than the QoS capability information element will be used as their use is well understood by those familiar with the 802.11 standard and not important for to the description of our invention. The QoS Capability information element 45 is subdivided into a number of subfields, namely; an AC-VO/U-APSD Flag subfield 45a, an AC-VI/U-APSD Flag subfield 45b, an AC-BK/U-APSD Flag subfield 45c and an AC-BE/U-APSD Flag subfield 45d, plus three other fields that are not important for the purposes of describing this invention. The terms "AC-VO", "AC-VI", "AC-BK" and "AC-BE" mean voice access category, video access category, background access category and best effort access category. An access category in the case of 802.11e is indicative of the prior with which packets are transmitted over the medium, with voice being the highest priority and best effort being the lowest priority. As mentioned in the previous paragraph, flag bits can be set in one or more of the four U-APSD subfields 45a-d that make up the QoS Capability information element 45 of the association request frame body 40 format. So for instance, in the event that the AC-VO/U-APSD Flag bit in subfield 45a is set to "1", this would indicate to QAP 12a that the AC associated with a voice frame for this QSTA is both trigger and delivery enabled when the QSTA is in U-APSD power save mode. As the result of receiving the information in subfield 45a the QAP 12a will set the AC associated with frames of voice information to be transmitted to QSTA 11a to be trigger enabled and all frames that the QAP receives that are to be transmitted to QSTA 11a will be buffered until the QAP receives a trigger frame.

In response to receiving the association request frame from QSTA 11a, the QAP 12a will send an association response frame to the QSTA which includes, among other information, a set of EDCA parameters which indicates to the QSTA that the QAP is configured to support the QSTA in U-APSD mode. All of the information needed to set bits in fields of the management frames used to enable U-APSD mode and to configure a QAP to enable it to manage the transmission of frame of information to a QSTA in U-APSD mode is contained in the MAC 26a stored in memory 26 of each one of the QSTAs 11a-d. The instructions utilized by the MAC to format the management frames will not be described here as someone of skill in the art in this area could easily implement such instructions.

Now, assuming that QSTA 11a is associated with QAP 12a, the QSTA can transmit a TSPEC request in a management frame also known as a management action frame. The TSPEC request is transmitted in order to request admission of a traffic flow with access categories that require priority transmission (AC_VO for instance). More specifically, a TSPEC describes the traffic characteristics and the QoS requirements of a traffic stream. It also allows other parameters to be specified that are associated with the traffic stream, such as a traffic classifier and ACK policy. The management action frame, mentioned above, has one field dedicated to various elements one of which is a TSPEC element. The body of the TSPEC element field is divided into a number of fields one of which is dedicated to TSPEC information, or TS info. The TS info field is further divided into several subfields one of which is the power save behavior (PSB) subfield. The PSB subfield is one bit that determines the power save method of delivery of buffered traffic used when the QSTA is operating in power save mode. The PSB subfield is set to "zero" when the QSTA is operating in legacy power save mode and it is set to "1" when operating in U-APSD mode.

The power management mode of a QSTA is indicated in the power management subfield of each frame control field it transmits to a QAP. When the power management subfield is set to "1", this indicates that the QSTA is transitioning to the lower powered U-APSD mode of operation and the QAP will start buffering frames of information associated with a particular AC at that time Assuming that the traffic flow is admitted by QAP 12a, and that QAP 12a is configured to manage frames of voice information to be transmitted to QSTA 11a using access category VO when this QSTA is in the U-APSD mode of operation. The 802.11e standard specifies that a QSTA, QSTA (11a) in this case, can transition to a higher powered state, contend for the wireless medium and periodically initiate an unscheduled service period (SP) to, among other things, transmit a trigger frame associated with in this case AC-VO to the QAP it is associated with, which in this case is QAP 12a. As the result of QAP 12a receiving the trigger frame, it responds by transmitting at least one frame of info labeled or prioritized as AC-VO and which is buffered waiting for delivery to QSTA 11a. The trigger frame can be a either a QoS data or null frame as specified by the 802.11e specification and for the purposes of this description we will assume that the trigger frame is a data frame. The periodicity and duration of these unscheduled SPs is controlled by information in the TSPEC which is controlled by the telephony application 25c in FIG. 2 and depends upon such things as the QSTA data rate and the median size of an MSDU (MAC service data unit).

Now, according to the 802.11 specification, a QSTA in U-APSD mode will periodically initiate an unscheduled SP which starts with the transmission of a trigger frame to the associated QAP. When two QSTAs initiate an unscheduled SP by waking up and sensing that the medium is free, they would attempt to transmit a trigger frame after an AIFS time and after the back off time for the AC has expired. According the 802.11, the arbitration interframe space "AIFS" shall be used by QSTAs to transmit all certain types of frames and is of variable duration. If at that point both QSTAs attempt to transmit a trigger frame at the same time, which is randomly possible, there will be a collision that results in both QSTAs initiating the back off and retransmission procedure specified by 802.11. However, as mentioned previously, the method of our invention allows the trigger frames for all QSTAs associated with a particular QAP to be synchronized such that they will not collide with each other. Further, the method of our invention arranges the trigger frames transmitted by multiple QSTA to be consecutively ordered one after the other and separated in time by the minimum inter frame time duration. This trigger frame arrangement results in more time being available between unscheduled SPs in order to conduct such operations as handing off a communication session from one access point to another.

Figure 5A:
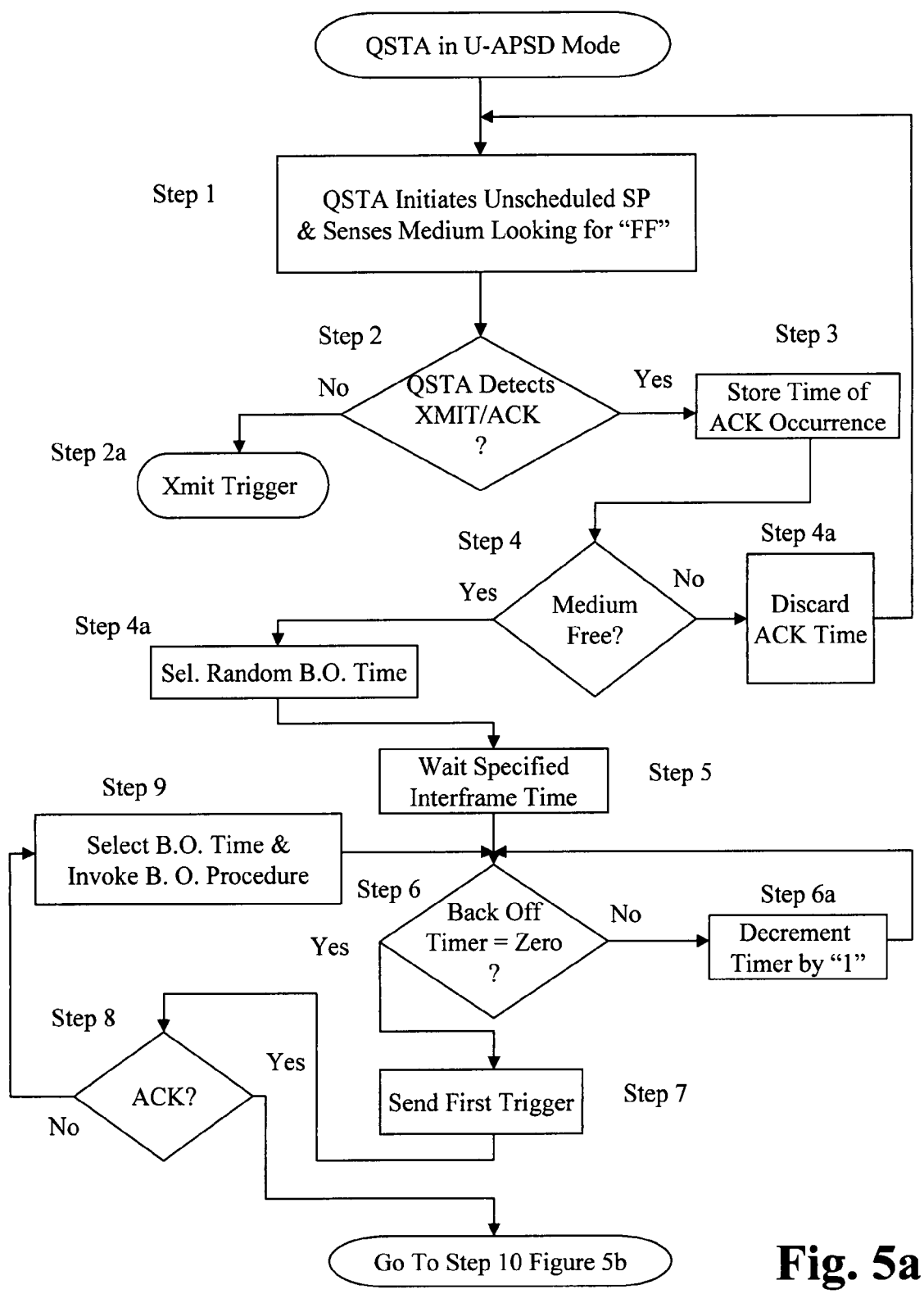
FIG. 5a is a portion of a logical flow diagram of one method of our invention.

The preferred embodiment of our invention will be described with reference to FIGS. 5a, 5b and 5c which is a logical flow diagram showing the operation of a QSTA, QSTA 11a in this case, to implement the method of our invention. With reference to FIG. 5a, it should be assumed that QSTA 11a has been configured to operate in the U-APSD mode and that standard trigger message transmit logic is initially disabled and that the QSTA is associated with QAP 12a. Starting at step 1, the QSTA transitions to a higher powered mode at time "X" and starts to sense the medium looking for a transmit/ACK operation directed to another QSTA associated with the same QAP. The transmit/ACK operation consists of a packet being transmitted by an access point, with which the QSTA is currently associated, to another QSTA, which could be QSTA 11b of FIG. 1 for instance, and this QSTA receiving the packet and responding with an ACK. In step 2, if the QSTA detects a transmit/ACK operation to the other QSTA 11b the process proceeds to step 3 where the phone stores an ID [typically the MAC address contained in the address field of the received packet] of the other QSTA 11b and the point in time that it detects the other QSTAs response to receiving the transmission, which in this case would be an ACK. Alternatively, the phone may not store the ID and only store the time that it detect the other QSTAs response. In the event that QSTA 11a does not detect a transmit/ACK operation, the process proceeds to step 2a where the QSTA transmits a trigger frame and proceeds to operate in the normal fashion, i.e., does not employ the process of this invention. The ID mentioned above is typically the MAC address contained in the address field of the received packet of information. Returning to step 3, after the QSTA stores at least the response time, the process proceeds to step 4 where the QSTA senses the medium to determine if it is free for some specified minimum period of time subsequent to the ACK, and if it is, proceeds to step 4a where the QSTA selects a random backoff timer value. The process then proceeds to step 5. On the other hand if in step 4 the medium is not free for the specified minimum period of time, the process discards the stored ACK time and returns to step 1. The specified minimum period of time in the preferred embodiment of our invention is 2 msec, but this time period could be longer or shorter as the intent is to determine whether or not the transmission of a trigger message immediately after the ACK would interfere with any other phone attempting to also transmit a trigger message at this time.

In this embodiment of our invention, the strategy is to sense the time of occurrence (as perceived by the sensing phone, QSTA 11a in this case) of the ACK from the QSTA to the QAP as being stable over multiple, i.e., two or more, sequential service periods. Further, for the purpose of the description in FIG. 5a, we will refer to a friendly phone "FF", from the perspective of QSTA 11a, as any other QSTA associated with the same QAP that receives a frame from the same access point with which the QSTA is currently associated and then responds to the access point with an ACK followed by some free air time, which we have somewhat arbitrarily selected to be two milliseconds.

Continuing to refer to FIG. 5a, in step 5, the phone performs a normal EDCA backoff procedure, as follows. It selects a random value to be used for a backoff time, then waits a specified interframe time after the specified minimum period of free time, which is typically an AIFSN, and in step 6, if the back off timer does not equal zero, the process proceeds to step 6a where the back off timer is decremented by "1" and the process returns to step 6. On the other hand, if in step 6 the phone's back off timer is equal to zero, the phone, in step 7, initiates an unscheduled service period by transmitting a trigger message to the access point with which it is associated.

Figure 5B:
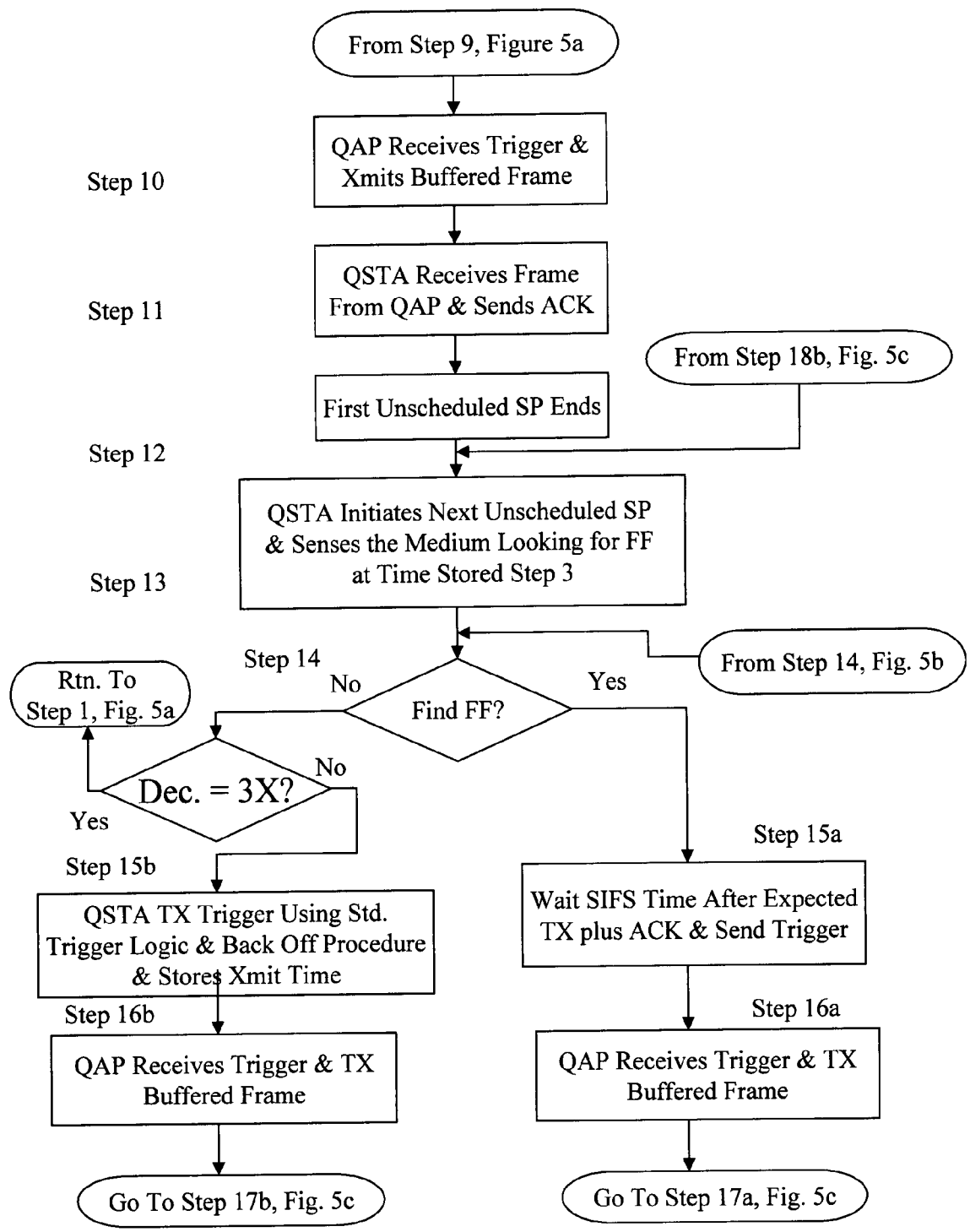

After the first trigger message is transmitted in step 7, the QSTA in step 8 determines whether it receives an ACK from the QAP in response to the trigger message, and if it has received an ACK the process proceeds to step 10 in FIG. 5b where the QAP transmits at least one frame buffered in the AC specified by the trigger message. If, on the other hand, in step 8 of FIG. 5a the STA does not receive an ACK in response to the trigger frame (could be the result of a collision for instance), then the process proceeds to step 9 where a new random backoff time is selected according to the 802.11e specification and the back off procedure is invoked again by returning to step 6.

Referring now to steps 10 to 11 of FIG. 5b, the QSTA 11a receives the buffered frame sent by the QAP 12a and responds with an ACK. At this point the unscheduled service period associated with this QSTA ends and the phone transitions back to the lower powered state in step 12. The phone stays in this lower powered state, waiting for a next periodic frame delivery interval. Then, in step 13 the QSTA 11a again transitions to a higher power state at time "X" (relative to the periodic frame delivery interval) and starts sensing the medium looking for an ACK, i.e., a "FF", at the time stored in step 3. At this point the QSTA disables the standard EDCA backoff and trigger message logic. It is necessary to disable this logic in order that the QSTA not contend for the medium in the standard manner and to modify the transmission timing of the trigger message. If in step 14 the QSTA detects and stores the end of an unscheduled service period for another QSTA at the same time that is stored in step 3, then the QSTA determines that the other QSTA is a "FF" and the process proceeds to step 15a. More specifically, the QSTA compares the time and possibly the ID of the QSTA detected and stored in the first unscheduled service period and the second unscheduled service periods, and if these two times and IDs are the same the QSTA determines that it has detected a "FF". In step 15a, the QSTA initiates another unscheduled service period by sending a trigger message, after the end of the expected "FF" unscheduled service period is detected which in this case is after the ACK is sensed, and then waiting less than the minimum time specified for any other phone to access the medium after it becomes free. This minimum specified time in the preferred embodiment of our invention is a SIFS time. In step 16a, the QAP 12a receives the trigger message sent by the QSTA (because the probability of collision with another QSTA's trigger messages have been eliminated) and responds by transmitting at least one buffered frame from the AC specified by the trigger message.

Figure 5C:
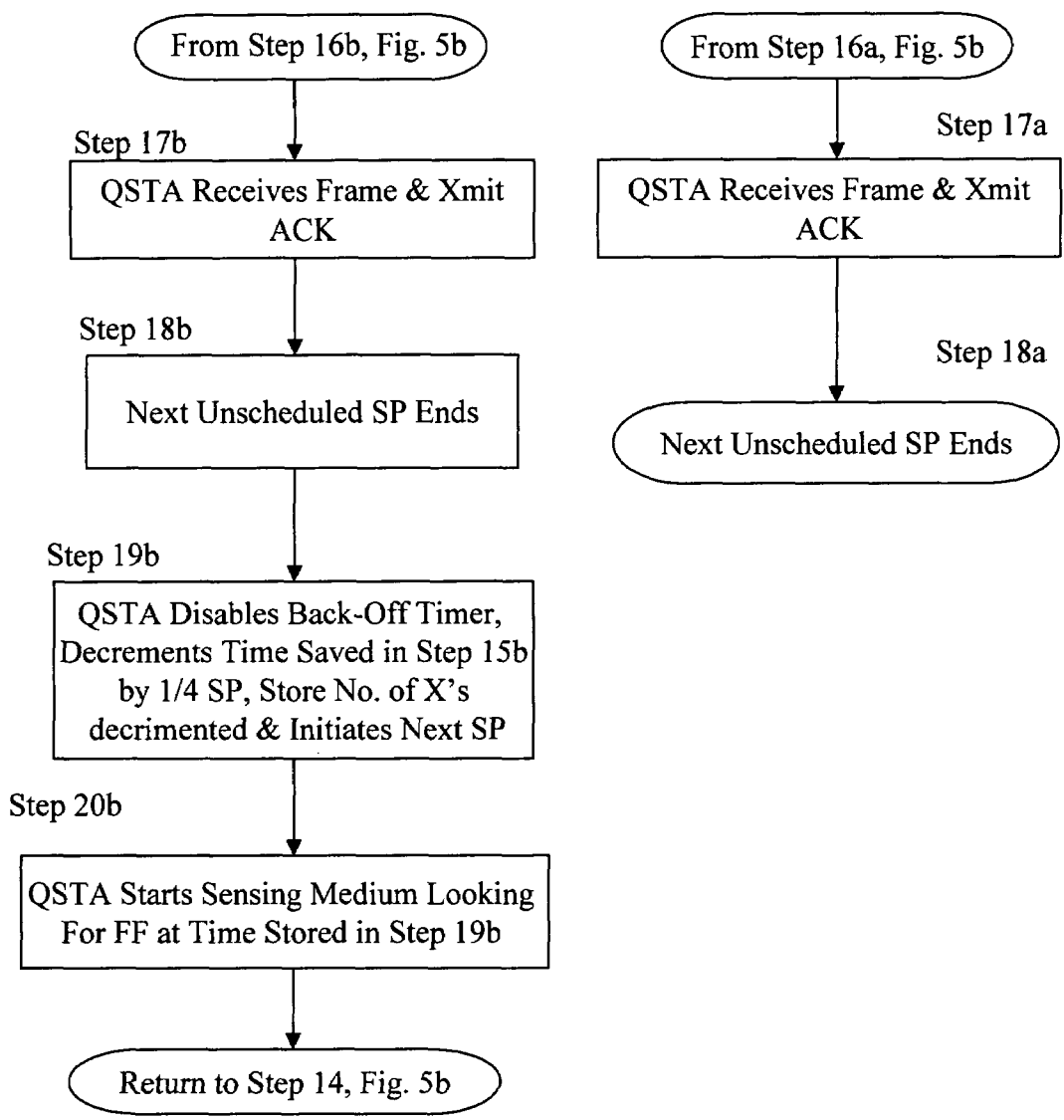
FIG. 5c is a continuation of the logical flow diagram in FIG. 5b.

Referring now to FIG. 5c in step 17a, the QSTA receives the buffered frame from the QAP and responds by transmitting an ACK at which point this unscheduled service period ends and in step 18a the phone transitions back to a lower powered state.

Returning to step 14 in FIG. 5b, if the QSTA does not detect a "FF" at the expected time stored in step 3, then the process proceeds to step 14b where the QSTA examines the stored number of times it has decremented and if this number is equal to 3, the process returns to step 1 in FIG. 5a, otherwise the process proceeds to step 15b, in which case the QSTA enables the back off timer and the standard trigger frame transmission logic and transitions to a higher powered state at a first transition time "X", stores this transition time and contends for the medium to send a trigger message. After successfully sending the trigger message, in step 15b, the QAP receives the trigger, transmits a buffered frame in step 16b, and the proceeds to step 17b in FIG. 5c. In step 17b, the QSTA receives the frame transmitted by the QAP and transmits an ACK and in step 18b the next unscheduled service period ends. Referring to FIG. 5c in step 19b, the QSTA disables the back off timer and the standard trigger message transmission logic, decrements the time at which it transitions to the higher powered state, time "X", by one-quarter service period (the time can be decremented more or less than ¼ service period, this particular increment to translate the stored time was not selected as the result of an empirical process) and stores the number of times it has decremented. In step 20b the QSTA transitions to a higher powered state at the next time "X" minus one-quarter service period and starts sensing the medium looking for a "FF" at which point the process returns to step 14 and proceeds as described above. It may be necessary to decrement more than once the time at which the QSTA transitions to the higher powered state in order to find a "FF", but the strategy we employ will eventually find a "FF", if one exists, and result in the QSTA transmitting a trigger message immediately after the end of the "FF" service period without the possibility that the message will collide with another trigger message. Alternatively, the process of decrementing the time described above can be terminated at "X" number of times. With "X" being selectable by either a designer or administrator.

In an alternative embodiment of the method described with respect to FIGS. 5a, 5b and 5c, instead of attempting to transmit a trigger message in the next unscheduled service period, it is possible to sense the medium for more than two consecutive unscheduled SPs in order to detect a "FF" to be stable during each of the service periods before attempting to transmit a trigger message. In this way it is more likely that the trigger message can be transmitted a SIFS time after the end of the "FF" unscheduled service period. More specifically, steps 1 to 4 in FIG. 5a could be repeated three or more times and if the time stored in step 3 was the same in three or more consecutive unscheduled service periods, then the QSTA could elect to transmit a trigger message a SIFS time after the TX plus ACK time sensed in the last unscheduled service period.

Figure 6A:
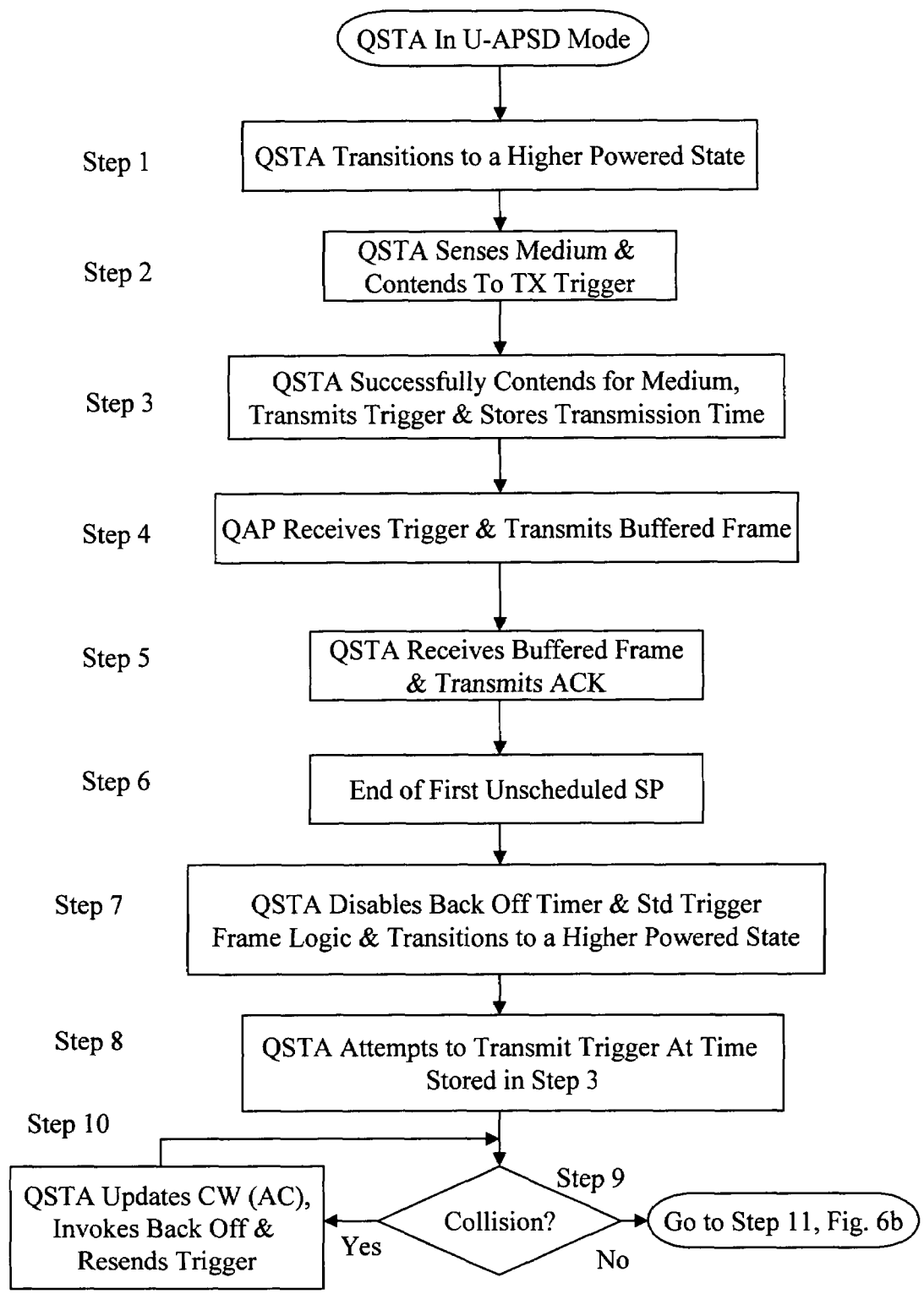
FIG. 6a is a logical flow diagram of another embodiment of our invention.

Another embodiment of our invention is described below with respect to FIGS. 6a and 6b. Assuming that the QSTA 11a has been configured to operate in the U-APSD mode and that standard trigger message transmission logic is enabled and that the QSTA is associated with QAP 12a, starting at step 1 of FIG. 6a, the QSTA transitions to a higher powered state at time "X" and in step 2 the QSTA starts a normal EDCA process, by sensing the medium and contending for a transmission opportunity to transmit a trigger message. In step 3, at the point that the QSTA gains access to the medium it transmits a trigger message and stores the transmission time in memory. In step 4, the QAP 12*a* receives the trigger message and in turn transmits at least one buffer frame from the AC corresponding to the AC of the trigger message. In step 5, the QSTA receives the buffered frame transmitted by the QAP and responds with an ACK. In step 6, the phone transitions to a lower powered state and the first unscheduled SP ends. In step 7, the QSTA disables its back off timer, disables its trigger frame transmission logic and transitions to a higher powered state at the next time "X". In step 8, the QSTA attempts to transmit a trigger frame at the time stored in step 3 without contending for the medium. In step 9, if the trigger message transmitted by QSTA 11*a* does not collide with another QSTA's trigger message, the process proceeds to step 11 in FIG. 6*b*. However, if the trigger message sent in step 8 does collide with another QSTA's trigger message, the process proceeds to step 10 where QSTA 11*a* picks a new transmission time. A practitioner skilled in the art can elect to use any one of a number of algorithms for selecting this new transmission time. For this description the new transmission time is selected by picking a new random backoff time per EDCA retry rules associated with the access category (AC) specified by the trigger message, invokes the back off procedure and attempts to retransmit the trigger message.

Figure 6B:
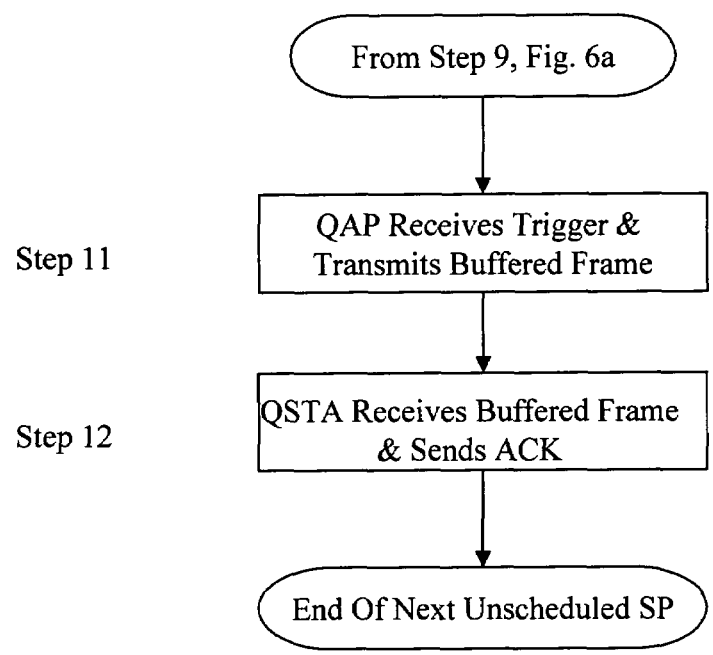

In step 11 of FIG. 6*b*, the QSTA stores this new time in memory as a replacement for the time stored in step 3, and the QAP receives the trigger message transmitted by QSTA 11*a* and responds by transmitting at least one frame, buffered in the AC specified by the trigger message, provided there are buffered frames to transmit. In step 12 of FIG. 6*b*, the QSTA receives the buffered frame and sends an ACK to the QAP and the unscheduled SP ends.

We claim:

1. A method for synchronizing the transmission of trigger messages through a wireless medium from a plurality of wireless communications devices associated with an access point, the method comprising:
    transitioning, by a first wireless communications device, to a higher powered state and detecting an ending time of a first unscheduled service period between a second wireless communication device and the access point;
    storing, by the first wireless communication device, the ending time of the first unscheduled service period in non-transitory memory in communication with the first wireless communication device;
    when the wireless medium to the access point is idle for a predetermined minimum period of time after storing the detected ending time:
        initiating, by the first wireless communication device, a back off timer from a randomly selected value;
        after waiting a specified interframe time, determining, by the first wireless communication device, whether the back off timer is equal to zero;
        when the back off timer is not equal to zero, decrementing, by the first wireless communication device, the back off timer until the back off timer is equal to zero;
        when the back off timer is equal to zero, transmitting a first trigger message from the first wireless communication device to the access point;
        receiving one or more buffered frames from the access point; and
        transitioning, by the first wireless communication device, to a lower powered state after transmitting the first trigger message and receiving any buffered frames in response;
    at the time of a desired next service period, transitioning, by the first wireless communications device, to the higher powered state and detecting an ending time of a next unscheduled service period between the second wireless communication device and the access point;
    storing, by the first wireless communication device, the ending time of the next unscheduled service period in the non-transitory memory;
    comparing, by the first wireless communication device, the ending times of the first and next unscheduled service periods of the second wireless communication device; and
    when the ending times of the first and next unscheduled service periods are the same with respect to a predetermined interval, transmitting a second trigger message from the first wireless communication device to the access point without sensing if the wireless medium to the access point is free for the predetermined minimum period of time after detecting the ending time of the next unscheduled service period, without re-initiating the back off timer, without waiting the specified interframe time and in less than a specified minimum time from when the ending time of the next unscheduled service period is detected, the specified minimum time corresponding to a time for any other wireless communication device to access the access point through the wireless medium.

2. The method of claim 1, wherein the at least one buffered frame is one of a null frame and a data frame.

3. The method of claim 1, wherein the first wireless communications device is a mobile phone.

4. The method of claim 1, wherein the specified interframe time is determined by an enhanced distributed coordination access backoff procedure.

5. The method of claim 1, wherein the specified minimum time is a short interframe space time.

6. The method of claim 1, wherein the predetermined minimum period is a period of time selected to determine that the medium is free long enough for another wireless device to successfully contend for the medium without having to change its backoff timer setting.

7. The method of claim 1, wherein the ending time of the first unscheduled service period is detected by sensing the wireless medium for both the transmission of a frame of information from the access point to the second wireless communications device followed by the second wireless communications device transmitting an acknowledgement to the access point.

8. The method of claim 1, wherein the trigger message is a trigger frame.

9. The method of claim 1, wherein the second wireless communications device is a mobile phone.

10. The method of claim 1, further comprising, for each subsequent unscheduled service period:
    transitioning, by the first wireless communications device, to the higher powered state and detecting an ending time of the corresponding subsequent unscheduled service period between the second wireless communication device and the access point;
    comparing, by the first wireless communication device, the ending times of the first and corresponding subsequent unscheduled service periods of the second wireless communication device;
    storing, by the first wireless communication device, the ending time of the corresponding subsequent unscheduled service period in the non-transitory memory; and
    when the ending times of the first and corresponding subsequent unscheduled service periods are the same with respect to the predetermined interval, transmitting a corresponding subsequent trigger message from the first wireless communication device to the access point without sensing if the wireless medium to the access point is free for the predetermined minimum period of time after detecting the ending time of the corresponding subsequent unscheduled service period, without re-initiating the back off timer, without waiting the specified interframe time and in less than the specified minimum time from when the ending time of the corresponding subsequent unscheduled service period is detected.

11. A method for synchronizing a transmission of trigger messages through a wireless medium from a plurality of wireless communication devices associated with an access point, the method comprising:

transitioning, by a first wireless communications device, to a higher powered state at a first transition time and storing the first transition time in non-transitory memory in communication with the first wireless communication device;

detecting, by the first wireless communication time, an ending time of a first unscheduled service period between a second wireless communication device and the access point;

when the wireless medium to the access point is idle for a predetermined minimum period of time after storing the detected ending time:

initiating, by the first wireless communication device, a back off timer from a randomly selected value;

after waiting a specified interframe time, determining, by the first wireless communication device, whether or not the back off timer is equal to zero;

when the back off timer is equal to zero, transmitting a first trigger message from the first wireless communication device to the access point;

receiving one or more buffered frames from the access point; and transitioning, by the first wireless communication device, to a lower powered state after transmitting the first trigger message and receiving any buffered frames in response;

determining, by the first wireless communication device, a next transition time by decrementing the stored first transition time by a pre-selected period of time;

storing, by the first wireless communication device, the next transition time in the non-transitory memory;

at the time of a desired next service period, transitioning, by the first wireless communications device, to the higher powered state at the next transition time and detecting an ending time of a next unscheduled service period between the second wireless communication device and the access point;

storing, by the first wireless communication device, the ending time of the next unscheduled service period in the non-transitory memory;

comparing, by the first wireless communication device, the ending times of the first and next unscheduled service periods of the second wireless communication device; and when the ending times of the first and next unscheduled service periods are the same with respect to a predetermined interval, transmitting a second trigger message from the first wireless communication device to the access point without sensing if the wireless medium to the access point is free for the predetermined minimum period of time after detecting the ending time of the next unscheduled service period, without re-initiating the back off timer, without waiting the specified interframe time and in less than a specified minimum time from when the ending time of the next unscheduled service period is detected, the specified minimum time corresponding to a time for any other wireless communication device to access the access point through the wireless medium.

12. The method of claim 11, further comprising, for each subsequent unscheduled service period:

transitioning, by the first wireless communications device, to the higher powered state at the next transition time and detecting an ending time of the corresponding subsequent unscheduled service period between the second wireless communication device and the access point;

comparing, by the first wireless communication device, the ending times of the first and corresponding subsequent unscheduled service periods of the second wireless communication device;

storing, by the first wireless communication device, the ending time of the corresponding subsequent unscheduled service period in the non-transitory memory; and when the ending times of the first and corresponding subsequent unscheduled service periods are the same with respect to the predetermined interval, transmitting a corresponding subsequent trigger message from the first wireless communication device to the access point without sensing if the wireless medium to the access point is free for the predetermined minimum period of time after detecting the ending time of the corresponding subsequent unscheduled service period, without re-initiating the back off timer, without waiting the specified interframe time and in less than the specified minimum time from when the ending time of the corresponding subsequent unscheduled service period is detected.

13. The method of claim 11, wherein the at least one buffered frame of information is one of a null frame and a data frame.

14. The method of claim 11, wherein the predetermined period of time comprises one quarter of the duration of an unscheduled service period.

15. The method of claim 11, wherein the first wireless communications device is a mobile phone.

16. The method of claim 11, wherein the specified minimum time is a short interframe space time.

17. The method of claim 11, wherein the ending time of the first unscheduled service period is detected by sensing the wireless medium for both the transmission of a frame of information from the access point to the second wireless communications device followed by the second wireless communications device transmitting an acknowledgement to the access point.

18. The method of claim 11, wherein the trigger message is a trigger frame.

* * * * *